United States Patent [19]

Eichenseer et al.

[11] 4,076,935

[45] Feb. 28, 1978

[54] GRINDING METHOD FOR CELLULOSE

[75] Inventors: Franz Eichenseer, Wiesbaden-Biebrich; Dieter Steidl, Hofheim-Diedenbergen; Walter Müller, Kelkheim-Hornau, all of Germany

[73] Assignee: Hoechst Aktiengesellschaft, Germany

[21] Appl. No.: 640,171

[22] Filed: Dec. 12, 1975

[51] Int. Cl.² .................... B27J 7/00; B27L 11/00; C08B 1/00; C08B 11/20

[52] U.S. Cl. .................................. 536/86; 241/28; 536/56; 536/88; 536/91

[58] Field of Search ............... 536/86, 56, 77, 85, 536/88, 91; 241/28, 175

[56] References Cited

U.S. PATENT DOCUMENTS

| | | | |
|---|---|---|---|
| 2,176,678 | 10/1939 | Neuroth | 536/86 |
| 2,565,420 | 8/1951 | Ayers | 241/28 |
| 2,833,758 | 5/1958 | Köhler et al. | 536/85 |
| 3,084,876 | 4/1963 | Podmore | 241/175 |
| 3,286,939 | 11/1966 | Karpenko et al. | 241/175 |
| 3,645,458 | 2/1972 | Tobe | 241/175 |
| 3,774,855 | 11/1973 | Wolf | 241/175 |

FOREIGN PATENT DOCUMENTS

| | | | |
|---|---|---|---|
| 683,627 | 12/1952 | United Kingdom | 536/86 |
| 737,127 | 9/1955 | United Kingdom | 536/86 |
| 1,080,249 | 8/1967 | United Kingdom | 536/86 |

*Primary Examiner*—Ronald W. Griffin
*Attorney, Agent, or Firm*—Berman, Aisenberg & Platt

[57] ABSTRACT

A method of reducing the particle size of cellulose compounds selected from the group consisting of cellulose and ether derivatives thereof which comprises grinding said compounds in a vibration mill in the presence of air and in the presence of sufficient water to yield a product having a water content of from 2 to 10% by weight, wherein at least 50% of the particles in the product have a particle size of 100 $\mu$ or less, a product obtained by said method and a binder composition containing said product.

14 Claims, No Drawings

GRINDING METHOD FOR CELLULOSE

This invention relates to a new method of reducing the particle size of cellulose and ether derivatives thereof.

Vibration mills can be used for comminuting a variety of materials, particularly mineral substances for example stone or cement.

However the comminution of cellulose derivatives, e.g. cellulose ethers, in ball mills or vibration mills has presented certain difficulties. Thus, it is only possible to grind in vibration mills those cellulose derivatives which have a relatively high friability and which are therefore relatively easily ground, e.g. hydroxyethyl cellulose. For fine grinding the operation must be carried out under a protective gas, e.g. in the presence of liquid nitrogen, in order to prevent explosions.

Cellulose ethers may be comminuted in rotary mills. However this has the disadvantage that a finely ground product can only be obtained by means of several grinding operations and is thus inefficient from the point of view of the amount of work and energy required. Moreover a considerable amount of heat is generated which dries out the cellulose ether causing it to decompose at least partially and become electrostatically charged. This can easily lead to dust explosions.

In summary therefore, according to the present state of the art, comminution of substantially amorphous and tough organic materials which are not readily friable cannot be carried out economically on known grinding apparatus without the risk of explosion occurring.

According to the present invention we now provide a method of reducing the particle size of cellulose and/or ether derivatives thereof which comprises grinding cellulose and/or one or more ether derivatives thereof in a vibration mill in the presence of air and in the presence of sufficient water to yield a product having a water content of from 2 to 10% by weight preferably from 5 to 8% by weight wherein at least 50% of the particles in the product are of a particle size $100\mu$ or less.

The method according to the invention may be used for the comminution of cellulose or ether derivatives thereof, hereinafter referred to as cellulose ethers, for example alkyl, hydroxyalkyl, alkylhydroxylalkyl and carboxyalkyl cellulose ethers having up to 2 carbon atoms in each alkyl group and up to 3 carbon atoms in each hydroxyalkyl group e.g. methyl cellulose, methylhydroxyethyl cellulose, methyl-hydroxypropyl cellulose, ethyl cellulose, ethyl-hydroxyethyl cellulose and mixed ethers of cellulose and carboxymethyl cellulose either alone or in admixture.

The process according to the invention has the advantage that grinding can be carried out in the absense of a protective gas and indeed in the presence of air, with no danger of explosion. In general high yields of product are obtained. It is only necessary for the ground product obtained to have the water content given above.

Providing the cellulosic starting material has a sufficiently high water content, grinding in the vibration mill may be effected without the addition of further water. Appropriately, the starting material used, preferably a cellulose ether, has a water content of 5 to 14%, preferably 7 to 10% by weight in order to yield a product with the required water content and to warrant the processing security. The initial water content of the starting material is not restricted to this range and may be 10 percent of more by weight. However if necessary water can be added during the grinding operation. Since only one grinding operation is generally required and less air is required inside the vibration mill, less water is being constantly removed from the atmosphere above the grinding material. The material to be processed thus comes into contact with more moisture in the vibration mill than in conventional grinding apparatus wherein the material must be subjected to several grinding processes and tends to dry out. This drying out leads to an increased risk of explosion which is greatly reduced in the method according to the present invention.

In the process according to the invention, the retention time can be varied depending on the desired proportions of fine and coarse particles in the product. In general a product wherein at least 65%, preferably at least 70% by weight of the particles have a particle size of $100\mu$ or less is obtained in a good yield even with a relatively short retention time, e.g. 5 to 15 minutes, and a single grinding operation.

If desired the cellulose ethers may be cross-linked before or after grinding e.g. by reaction with glyoxal with partial acetal formation. The amount of glyoxal reacted is preferably not more than 5% by weight of the cellulosic material. In this way enlargement of the molecules is obtained, resulting in a reduction in the dissolution rate in water. Since water is not absorbed as quickly, the tendency of the particles to clump together when mixed with water is reduced.

In addition to friable cellulose ethers, cellulose ethers e.g. methyl cellulose, which are amorphous and tough can be finely ground in a vibration mill using the method according to the invention. Sometimes a high yield of the finely ground product can be obtained in a single grinding operation. The friability of methyl cellulose can also be increased by incorporating further ether groups e.g. hydroxyethyl ether groups, whereby a mixed ether is produced and/or by mixing hydroxyethyl cellulose therewith. The proportion of hydroxyethyl ether groups introduced into methyl cellulose to form a mixed ether can be from 1.5 to 10%, preferably up to 6%, by weight of the total ether groups, it being understood that in this context the term "ether group", does not refer to parts of the cellulose chain connected ether linkages. The proportion of hydroxyethyl cellulose mixed into methyl cellulose may be from 1.5 to 10%, preferably up to 6% by weight of the mixture.

In general, the vibration mill can be operated at relatively low frequencies, e.g. 1,000 to 1800 r/min., and small oscillation amplitudes, e.g. from 6 to 12 mm, so as to treat the material gently and not heat it too much. Thermal decomposition of the cellulose or cellulose ether can thus be kept at a relatively low level, in contrast to the previously known methods with several grinding operations. Moreover, the lower frequencies and small amplitudes mean that any foreign bodies present in the material will not cause sparking.

The starting material may if desired be ground in its natural state or it may compressed prior to grinding depending on the desired size of the specific surface area and bulk weight of the product. In general powders with a high specific surface area and other special properties, e.g. good flow properties and high bulk density, can be obtained using the method of the present invention. For example, woolly or coarse methyl cellulose can be converted into a flowing powder with a relatively high bulk weight which is very easy to measure out and package. The use of a vibration mill as compared to other grinding methods is advantageous since the interior surface of the particles is much more retained but only the projecting edges and spikes are removed to a much greater extent.

In general, if an uncompressed starting material with a moisture content of at least 10% by weight is used, the bulk weight of the ground product may be increased, for example, to 1.4 to 2.9 times its value in a single grinding operation. For example, if an uncompressed starting material with a bulk weight of 120 to 200, preferably 140 to 170, g/l is used, a ground product with a bulk weight of from 280 to 350, preferably 290 to 320, g/l can generally be obtained.

On the other hand, highly compressed coarse granulates which are slow to dissolve in water may be converted into powders with a lower bulk weight and a higher desired specific surface area, by grinding in a vibration mill by the method according to the invention. Thus, for example, a compressed granulate with a bulk weight of 480 to 520, preferably 490 to 510, g/l can in general be converted in one grinding operation to a product with a bulk weight of 370 to 450, preferably 390 to 420 g/l. In general the difference between the bulk weight of the starting material and that of the ground material is substantially less than for uncompressed starting materials; for compressed material tends to remain virtually constant. The starting material may, if desired, be compressed in conventional manner, e.g. in a kneader with addition of water, optionally followed by extrusion, prior to grinding.

The solubility of the ground material depends on its bulk weight. Cellulose and cellulose ethers in the form of extremely fine powders with a high specific surface area can thus be produced by the method according to the invention which can be wetted quickly and go into solution quickly.

The finely ground products produced by the method according to the invention can be used in many ways, particularly in binder compositions for use in the building industry and by handymen. They may thus be used for example as additives for mortar, gravel, cement and gypsum, in wall-paper pastes, in cellulose filler compositions used as moulding compounds, and as additives for synthetic resins, particularly for producing moulded and/or otherwise decorated synthetic resin surfaces. The products produced according to the invention, particularly the cellulose ethers, are preferably used as additives for plaster compositions for use in the building trade, particularly for machine plaster compositions which generally contain inorganic components and a minor proportion of methyl cellulose and/or mixed ethers thereof. The plaster composition must be capable of being wetted with water extremely quickly, must not become lumpy and must bind water uniformly so that cracks in the finished plaster surface do not appear. A very high level of water retention is required. The powdered cellulose component in the plaster composition fulfills these functions.

The following examples serve to illustrate the method according to the present invention.

EXAMPLE I

A wad of methylhydroxyethyl cellulose with a bulk weight of 150 g/l is ground in a vibration mill at room temperature and in the presence of air at a throughput rate of 20 kg/per hour. A ground material is obtained having the following composition according to screen analysis: $<100\mu$ 75%, 100 to $125\mu$ 10%, 125 to $200\mu$ 13% and 200 to $300\mu$ 2%, residual water content; 4.6 % of initial water content. The bulk weight of the product is 300 g/l; the specific surface area is 0.6 m$^2$/g. The particle size is made more uniform in known manner, i.e. by screening and regrinding the coarse portions.

COMPARISON

If the same starting material is ground in a hammer mill, no powder is obtained. The waddy character of the methylhydroxyethyl cellulose remains so that is it almost impossible to screen. The poor flowing properties of the material make it virtually impossible to process.

EXAMPLE 2

Pre-compressed methyl cellulose granulate with a bulk weight of 480 g/l and with 85% of the particles having a particle size of $>200\mu$ and 5% of the particles a particle size of $>500\mu$ is ground to a powder in a vibration mill with a throughput of 105 kg/per hour. According to the screen analysis, the ground material has the following particle size distribution; $<100\mu$ 76%, 100 to $125\mu$ 11%, 125 to $200\mu$ 10% and 200 to $300\mu$ 3%. The bulk weight of the product is reduced to 405 g/l and the specific surface area increased from $<0.1 m^2/g$ to $0.2 m^2/g$. Residual water content: 3.8 % of initial water content.

COMPARISON

The same granulate as used in Example 2 above is ground in a conventional hammer mill. Three times as much grinding energy is required to grind it to a powder of comparable fineness. The bulk weight remains almost constant at 490 g/l and the specific surface area of $<0.1 m^2/g$ is not perceptibly altered.

EXAMPLE 3

Commercial hydroxyethyl cellulose with a bulk weight of 540 g/l and a screen analysis as follows: $>300\mu$ 50%, 180 to $300\mu$ 45% and $<180\mu$ approximately 5%, is ground in a vibration mill at room temperature and in the presence of air at a throughput of 180 kg/h. After a single grinding operation, a powdered ground material is obtained with the following screen analysis: $>125\mu$ 20%, 60 to $125\mu$ approximately 30%, $<60\mu$ approximately 50%. The bulk weight is increased to 550 g/l. Residual water content: 4.2% of initial water content.

EXAMPLE 4

Carboxymethyl cellulose with a bulk weight of 440 g/l and a screen analysis as follows: $>1,000\mu$ approximately 5%, 750 to $1,000\mu$ approximately 30%, 500 to $750\mu$ approximately 45%, 180 to $500\mu$ approximately 50%, $<180\mu$ approximately 5%, is ground in a vibration mill at room temperature in the presence of air at a throughput of 140 kg/h. After one grinding operation, a powder is obtained with the following particle size distribution: $>300\mu$ about 4%, 180 to $300\mu$ about 10%, 60 to 180 $\mu$ 31%, $<60\mu$ 55%. The bulk weight is increased to 530 g/l. Residual water content: 3.9% of initial water content.

EXAMPLE 5

Coarsely comminuted cellulose with a bulk weight of ca. 400 g/l is ground in a vibration mill to produce fine, flowing cellulose powder. After being ground once, the cellulose powder has a fines content of 50% with a particle size of $<100\mu$. The fines portion can be concentrated by screening. The bulk weight of the cellulose powder obtained is 150-180 g/l. Residual water content: 2.8% of initial water content.

It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

What we claim is:

1. A method of reducing the particle size of a cellulose compound, selected from the group consisting of cellulose and an ether derivative thereof, which comprises grinding the compound in a vibration mill in contact with air and with sufficient water to yield a product having a water content of from 2 to 10% by weight and wherein at least 50% of the particles in the product have a particle size of $100\mu$ or less.

2. A method as claimed in claim 1 wherein the cellulose compound is a member selected from the group consisting of alkyl cellulose, hydroxy-alkyl cellulose, alkylhydroxyalkyl cellulose and carboxyalkyl cellulose, wherein the alkyl contains up to 2 carbon atoms and wherein the hydroxyalkyl contains up to 3 carbon atoms.

3. A method as claimed in claim 1 which comprises grinding, in a single grinding operation, an uncompressed starting material having a bulk density of from 120 to 200 g/l to obtain a product having a bulk density of from 280 to 350 g/l.

4. A method as claimed in claim 1 which comprises operating the vibration mill 5 at a vibration frequency of from 1000 to 1800 rotations/min. and at a vibration amplitude of from 6 to 12 mm.

5. A method as claimed in claim 1 which comprises grinding, in a single grinding operation, a starting material having a water content of at least 10% by weight to obtain a product having a bulk density of from 1.4 to 2.9 times that of the starting material.

6. A method as claimed in claim 1 which comprises reacting cellulose ether, prior to or subsequent to grinding, with up to 5% by weight, based on the weight of the cellulose ether, of glyoxal with partial acetal formation and cross-linking.

7. A method as claimed in claim 1 which comprises grinding a mixed cellulose ether, wherein at least 90% by weight of the ether groups are methyl ether groups.

8. A method as claimed in claim 1 which comprises grinding a mixed cellulose ether wherein from 1.5 to 10% by weight of the ether groups are hydroxyethyl ether groups.

9. A method as claimed in claim 1 which comprises grinding a coarse or tough methyl cellulose in a single grinding operation to a free-flowing powder having a relatively high bulk density of from 480 to 520 g/l.

10. A particle-size-reducing method as claimed in claim 1 wherein the cellulose compound, prior to grinding, is a starting material having a bulk density of from 120 to 520 g/l, the method comprising grinding the starting material in a single grinding operation.

11. A method as claimed in claim 1 which comprises grinding, in a single grinding operation, a compressed starting material having a bulk density of from 480 to 520 g/l to obtain a product having a bulk density of from 370 to 450 g/l.

12. A process as claimed in claim 11 wherein the starting material has been compressed by treatment in a kneader with addition of water.

13. A process as claimed in claim 12 wherein the starting material is preliminarily compressed by kneading in a kneader with water and then extruded.

14. A binder composition containing a product obtained according to a method as claimed in claim 1.

* * * * *

UNITED STATES PATENT AND TRADEMARK OFFICE
CERTIFICATE OF CORRECTION

PATENT NO. : 4,076,935

DATED : February 28, 1978

INVENTOR(S) : EICHENSEER ET AL.

It is certified that error appears in the above-identified patent and that said Letters Patent are hereby corrected as shown below:

Title page, left column, below "[22]" insert:
 --[30] Foreign Application Priority Data
  December 13, 1974  Germany..........2458998--.
Column 3, line 27, "for" should read --the bulk weight for--. Column 5, line 24 (claim 2, line 3), "hydroxy-alkyl" should read --hydroxyalkyl--; line 35 )claim 4, line 2), "mill 5" should read --mill--.

Signed and Sealed this

Twenty-first Day of November 1978

[SEAL]

Attest:

RUTH C. MASON
*Attesting Officer*

DONALD W. BANNER
*Commissioner of Patents and Trademarks*